(12) United States Patent
Sawada (10) Patent No.: US 6,431,664 B1
(45) Date of Patent: Aug. 13, 2002

(54) WHEEL

(76) Inventor: Mitsuo Sawada, 1095-250 Yashima Higashimachi, Takamatsu City Kagawa Prefecture, Takamatsu (JP)

( * ) Notice: Subject to any disclaimer, the term of this patent is extended or adjusted under 35 U.S.C. 154(b) by 0 days.

(21) Appl. No.: 09/703,707

(22) Filed: Nov. 2, 2000

(30) Foreign Application Priority Data

Apr. 27, 2000 (JP) ........................................ 2000-126921

(51) Int. Cl.$^7$ ................................................ B62D 57/02
(52) U.S. Cl. ........................................ 305/1; 301/5.23
(58) Field of Search ................... 305/1, 4; 301/5.23, 301/124.1, 125

(56) References Cited

U.S. PATENT DOCUMENTS

| | | | | |
|---|---|---|---|---|
| 2,400,824 A | * | 5/1946 | Jackson | 305/1 |
| 2,633,363 A | * | 3/1953 | Marshall | 305/1 |
| 2,742,973 A | * | 4/1956 | Johannesen | 305/1 |
| 3,214,184 A | * | 10/1965 | Kemm | 305/1 |
| 3,695,727 A | * | 10/1972 | Sesky et al. | 305/1 |
| 4,457,526 A | * | 7/1984 | Persson | 305/1 |

OTHER PUBLICATIONS

Japanese document No. 57–191669, 1982, partial translation.

* cited by examiner

Primary Examiner—S. Joseph Morano
Assistant Examiner—Long Bao Nguyen
(74) Attorney, Agent, or Firm—Arent Fox Kintner Plotkin & Kahn (57) ABSTRACT

A wheel comprising (i) an axle secured to a movable body, (ii) a rotator journaled on the axle so as to be freely rotatable and having at least three apexes disposed rotationally symmetrically around the axle, and (iii) rollers, each roller being mounted on one of the apexes of the rotator so as to be freely rotatable. Each side between apexes of the rotator is provided with a guiding surface which has small frictional resistance and is slidable.

7 Claims, 11 Drawing Sheets

WHEEL

BACKGROUND OF THE INVENTION

This invention relates to a wheel. More specifically, this invention relates to a wheel which can easily go up and down stairs.

The Japanese Unexamined Patent publication No. 301459/H1 (1989) discloses a wheel which is capable of going up and down stairs (hereinafter referred to as "prior art 1").

Figure 10:
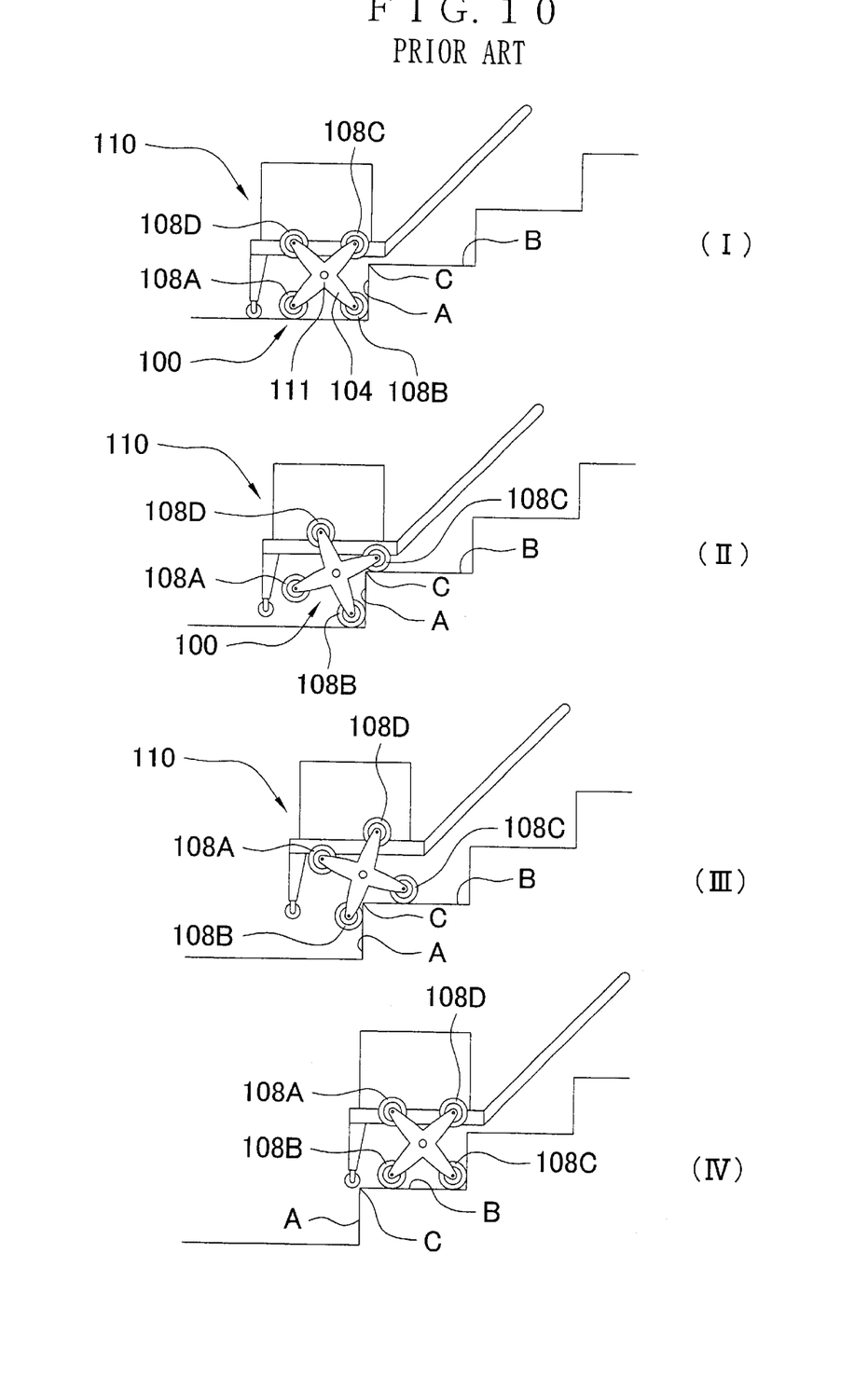
FIG. 10 is the illustrations of the wheel 100 of the prior art 1.

FIG. 10 is schematic views of a wheel 100 of the prior art 1. The reference numeral 110 is a cart. An axle 111 is secured horizontally to a lower part of the cart 110. A wheel 100 is journaled on each end portion of the axle 111 so as to be freely rotatable.

The wheel 100 has a cross-shaped rotator 104, which is journaled freely rotatably on the axle 111. The rotator 104 has four rollers 108A, 108B, 108C, and 108D, each roller journaled on one of the four tips of the rotator 104 so as to be freely rotatable.

Accordingly, as the rotator 104 of the wheel 100 rotates on the axle 111, the rollers 108A to 108D revolve around the axle 111.

Referring to FIG. 10, the movement of the wheel 100 going up stairs will be described next.

The letter "A" indicates the riser of the first step of a stairway; "B" the tread; "C" the top corner.

As shown in FIG. 10(I), while the cart 110 is moving on the surface of a road, the rollers 108A and 108B roll on the road surface and the rollers 108D and 108C are positioned above the rollers 108A and 108B, respectively.

As shown in FIG. 10(I), when the cart 110 reaches a stairway, the front lower roller 108B comes in contact with the riser "A" of the first step.

As shown in FIG. 10(II), when the cart 110 is pulled up forward, the wheel 100 turns forward about the roller 108B, which remains pressed against the riser "A" of the first step, for the rotator 104 is rotatable on the axle 111. Accordingly, the front upper roller 108C moves onto the tread "B" of the first step beyond its top corner "C".

As shown in FIG. 10(III), when the cart 110 is further pulled up forward, the roller 108C rolls forward on the tread "B" and the roller 108B rolls on the riser "A" upward.

Thus, the rotator 104 can be turned on the axle 111 and pulled up forward, and hence the wheel 100 and the cart 110 can be pulled up forward.

As shown in FIG. 10 (IV), when the cart 110 is still further pulled up forward, the roller 108B goes beyond the top corner "C" and gets onto the tread "B". Thus, the whole wheel 100 and hence the cart 110 get onto the tread "B" of the first step.

As described above, the wheel 100 of the prior art 1 can go up a stairway by turning the rotator 104 on the axle 111 and rolling the front lower roller and the front upper roller on the riser "A" and the tread "B", respectively, of each step.

The Japanese Unexamined Utility Model publication No. 191669/S57 (1982) discloses another wheel which is capable of going up and down stairs (hereinafter referred to as "prior art 2").

Figure 11:
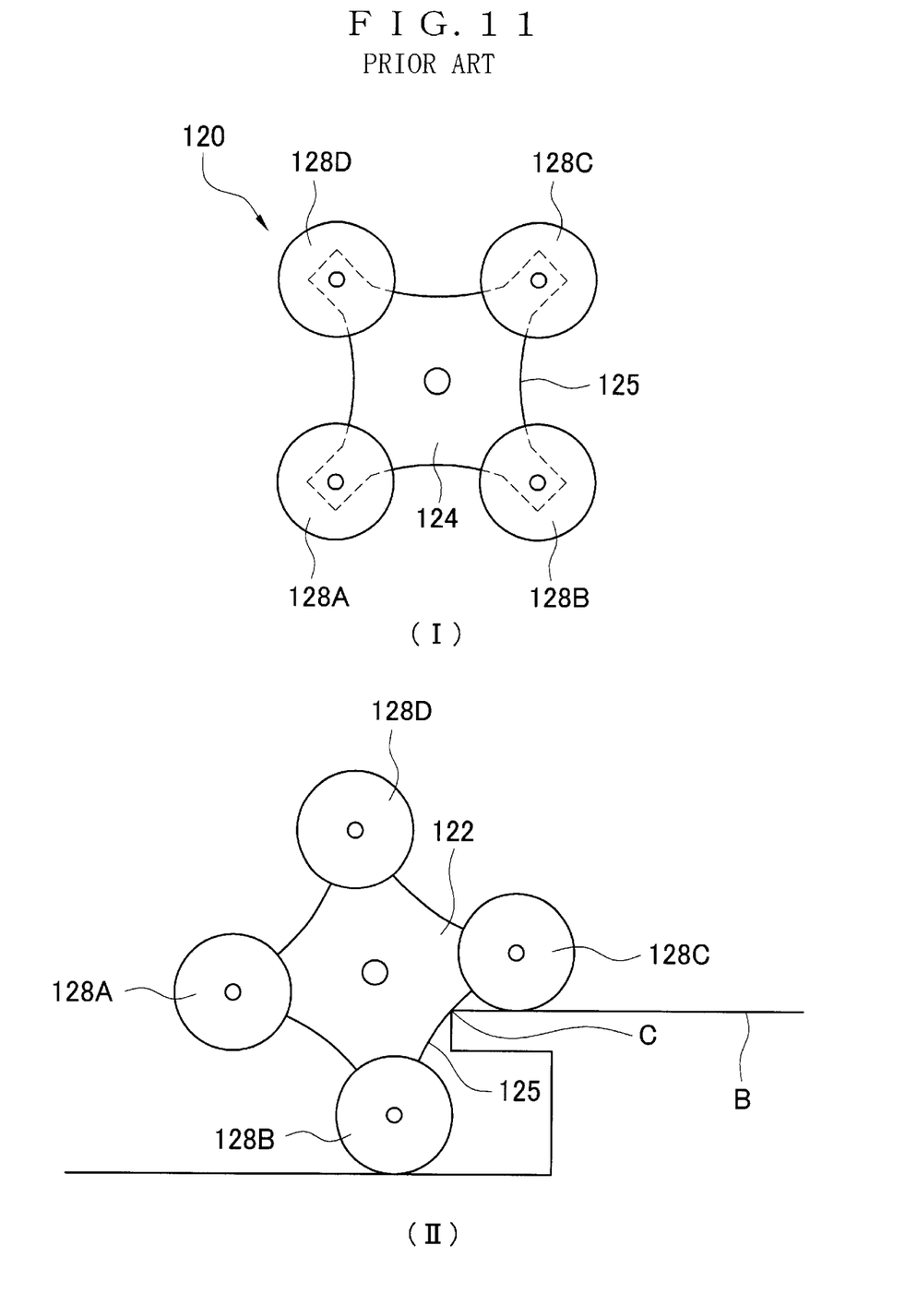
FIG. 11 is the illustrations of the wheel 120 of the prior art 2.

FIG. 11 is schematic views of a wheel 120 of the prior art 2. The wheel 120 comprises a rectangular rotary plate 124 and four rollers 128A, 128B, 128C, and 128D which are supported by brackets at the four corners of the rotary plate 124. Each of the four sides 125 of the rotary plate 124 is concaved in an arc-like shape.

In the same way as the wheel 100 of the prior art 1, the wheel 120 gets on a step by putting the front upper roller 128C on the tread "B" of the step and rolling it on the tread "B" forward and, at the same time, rolling the front lower roller 128B upward on the riser "A" of the step. Although the rotary plate 124 is different from the rotator 104 of the wheel 100 in shape, the principle of the wheel 120 is the same as that of the wheel 100.

The wheels 100 and 120 of the prior arts 1 and 2 have the following shortcomings (1) to (4).

(1) In case of the wheel 100 of the prior art 1, when the rotator 104 turns about the roller 108B, the roller 108C comes in contact with the tread "B" at a relatively high speed, as shown in FIGS. 10(I) and 10(II). Accordingly, when the roller 108C bumps against the tread "B", it gives rise to a large shock. Thus, the cart 110 is exposed to large shocks and vibration while it is pulled up the stairway. The goods in the cart 110 may be damaged. In addition, the hands pulling the cart 110 are exposed directly to the unpleasant vibration of the cart 110.

(2) The wheel 100 of the prior art 1 cannot be pulled up a stairway without risers "A" because it cannot be turned about the roller 108B to put the roller 108C on the tread "B". Even if the roller 108C can be put on the tread "B", the roller 108B cannot goes up toward the tread "B" because there is not a riser "A" for the roller 108B to roll on.

(3) In case of the wheel 120 of the prior art 2, because each of the four sides of its rotary plate 124 is concaved in an arc-like shape, the roller 128B can be raised by leaning the side 125 on the top corner "C" of a step and turning the rotary plate 124 forward about the top corner "C"even if the stairway has no risers "A", as shown in FIG. 11 (II). However, in order to pull up the roller 128B onto the tread "B", the wheel 120 has to be moved by sliding the side 125 on the top corner "C". Because the side 125 has no guiding function, there occurs large resistance between the wheel 120 and the stairway. Accordingly, although the wheel 120 can be pulled up a stairway without risers "A", it requires large force to pull the cart up the stairway.

(4) In case that the wheel 120 of the prior art 2 is pulled up a stairway with risers "A", a side 125 is slid on the top corner "C" of each step and the front lower roller 128B comes in contact with the top corner "C" of said step. At this time, if the center of the front lower roller 128B is lower than the tread "B" of said step, the front lower roller 128B runs almost horizontally into the riser "A" of said step and its horizontal movement ceases. Accordingly, when the front lower roller 128B runs into the riser "A" of said step, it causes a large shock. The goods in the cart may be damaged by the shock and vibration. In addition, the hands pulling the cart are exposed to the vibration of the cart.

Besides, the horizontal component of the pull force is wasted, just used to bump the front lower roller 128B against the riser "A" of said step. Only the vertical upward component of the pull force is made use of for raising the center of the front lower roller 128B above the tread "B" of said step. Thus, it requires large force to pull the cart up the stairway.

In accordance with the above, the object of the present invention is to provide a wheel which enables us to carry a movable body equipped with two units of the wheel easily up a stairway, even without risers, with small pull force, causing small shocks and vibration.

SUMMARY OF THE INVENTION

According to the first aspect of the present invention, there is provided a wheel comprising (i) an axle secured to a movable body, (ii) a rotator journaled on the axle so as to be freely rotatable and having at least three apexes disposed rotationally symmetrically around the axle, and (iii) rollers, each roller being mounted on one of the apexes of the rotator so as to be freely rotatable. Each side between apexes of the rotator is provided with a guiding surface which has small frictional resistance and is slidable.

According to the second aspect of the present invention, there is provided the wheel of the first aspect wherein each guiding surface is concaved in an arc-like shape.

According to the third aspect of the present invention, there is provided the wheel of the first or second aspect wherein (i) the point of intersection of each guiding surface and the periphery of one of the two rollers defining said guiding surface is positioned outside of the straight line which extends from the center of the roller to be tangent to the periphery of the other roller from the outside of the wheel and (ii) the angle between each end portion of each guiding surface and the straight line which is, at the point of intersection of said end portion of said guiding surface and the periphery of the roller corresponding to said end portion, tangent to the periphery of the roller is small.

The advantages offered by the first aspect of the present invention are as follows. While the movable body equipped with two units of the wheel of the invention is moved on the surface of a road, two rollers of each wheel roll on the road surface. Accordingly, the movable body can be moved smoothly on the road surface. When it comes to a stairway, by putting the forward-facing guiding surface of the rotator of each wheel into contact with the top corner of each step and pulling up the movable body forward, the rotator of said wheel can be slid on the top corner of said step and moved upward, for said guiding surface are slidable and has small frictional resistance. Therefore, even if the stairway is of a no-riser type, by putting the forward-facing guiding surface of the rotator of each wheel into contact with the top corner of each step, the movable body can be carried up the stairway with relatively small force. Moreover, every time the movable body climbs a step, the rotator of each wheel turns by the central angle between rollers to face its next guiding surface forward so that it can be put into contact with the top corner of the next step. Thus, the movable body can be carried up the stairway step by step successively.

The advantages offered by the second aspect of the present invention are as follows. Because each guiding surface of each wheel is concaved in an arc-like shape, the angle between the tangent to the point of said guiding surface where it is in contact with the top corner of a step and the tread of the step is small. Therefore, the component of the pull force to pull the rotator up forward is large. Accordingly, the movable body can be carried up the stairway with relatively small pull force. In addition, because the rotator of each wheel turns about the top corner of each step, the distance between the front upper roller of said wheel and the top corner of said step becomes small and, hence, the turning speed of the front upper roller of said wheel becomes small. Accordingly, the shock to be caused by putting the front upper roller of each wheel on the tread of each step can be reduced. Moreover, because the contact point between the top corner of each step and a guiding surface of the rotator of each wheel moves backward on said guiding surface while said rotator turns forward continuously about the top corner of said step, the front upper roller of said rotator can be put on the tread of said step without causing a large shock. Thus, the movable body can be carried up the stairway step by step smoothly and successively, causing relatively small shocks and vibration.

The advantages offered by the third aspect of the present invention are as follows. While the front upper roller of each wheel is pulled up forward onto the tread of the next step and rolling forward on the tread, the front lower roller of said wheel is pulled upward and the point of intersection of the guiding surface between the front upper and lower rollers and the periphery of the front lower roller is drawn toward the top corner of the next step. When the point of intersection of said wheel comes in contact with the top corner of the next step, the center of the front lower roller of said wheel is positioned higher than the top corner of the next step. Accordingly, the horizontal component of the pull force applied to the movable body acts to turn the front lower roller of said wheel upward about the top corner of the next step. Thus, compared with the force otherwise necessary to pull up the front lower roller of each wheel onto the next step, it can be pulled up with smaller force. Moreover, because the front lower roller of each wheel turns forward when it comes in contact with the top corner of the next step, the shock can be reduced. In addition, each guiding surface of each wheel connects smoothly with the peripheries of the rollers defining said guiding surface. Therefore, the shock and vibration to de caused by the front lower roller of each wheel coming in contact with the top corner of the next step can be reduced and said front lower roller can be moved smoothly from the riser to the tread of the next step.

BRIEF DESCRIPTION OF THE DRAWINGS

The features and advantages of the present invention will become more clearly appreciated from the following description in conjunction with the accompanying drawings, in which:

FIG. 3(I) is a front view of the wheel 10 of FIG. 1 and FIG. 3(II) is a sectional view taken along the arrowed line II—II of FIG. 3(I);

DETAILED EXPLANATION OF THE INVENTION

Referring to the drawings, a preferred embodiment of the present invention will now be described.

Figure 1:
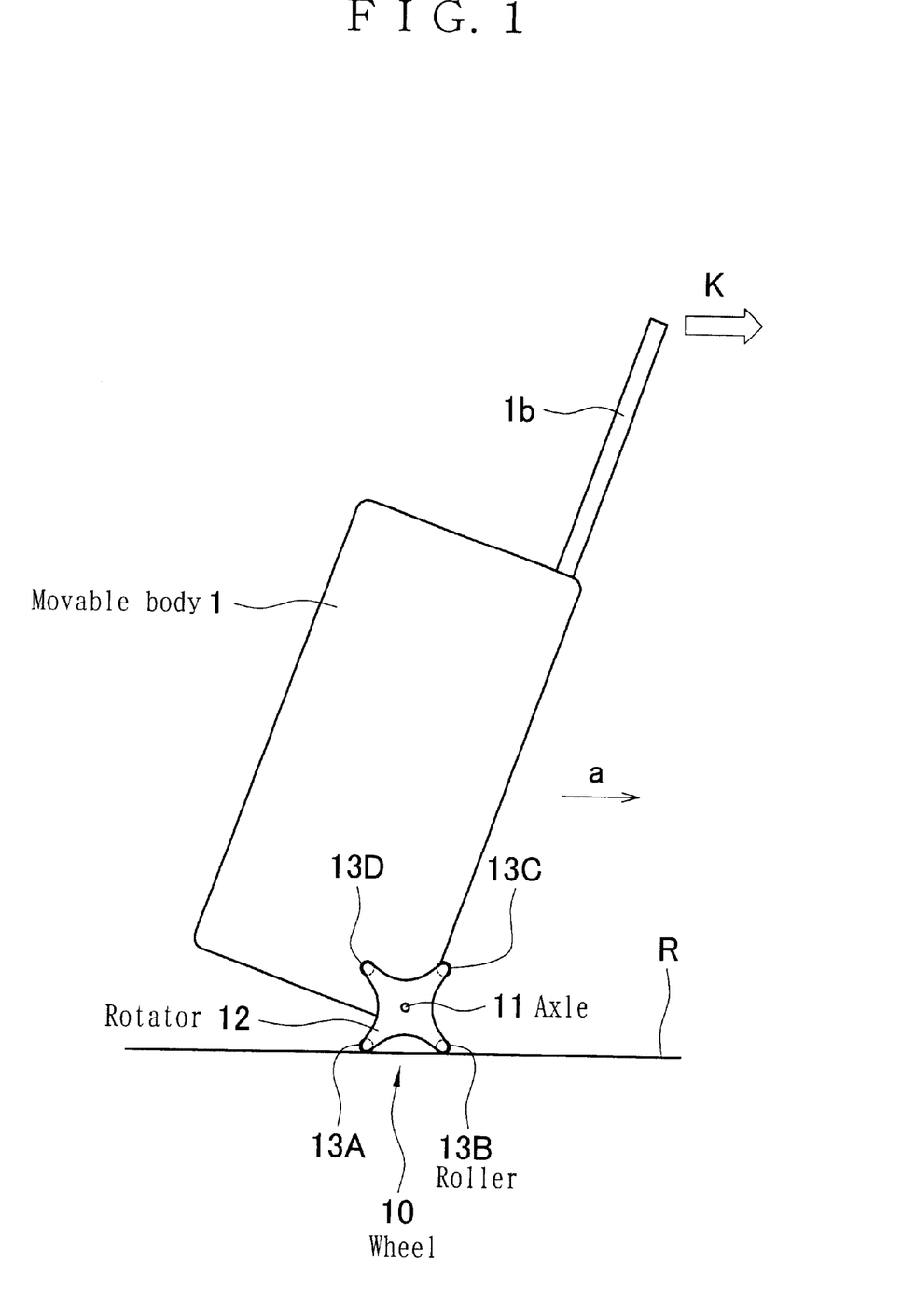
FIG. 1 is a schematic illustration of an embodiment of wheel 10, in service, of the present invention.

In FIG. 1, the reference numeral 1 indicates a movable body. The movable body 1 is fitted with a pair of wheels 10. Various articles such as suitcases, baby carriages, carts including old-people's carts, robots, children's bags, and so on can be fitted with wheels 10.

The movable body 1 is not limited to the above articles.

Figure 2:
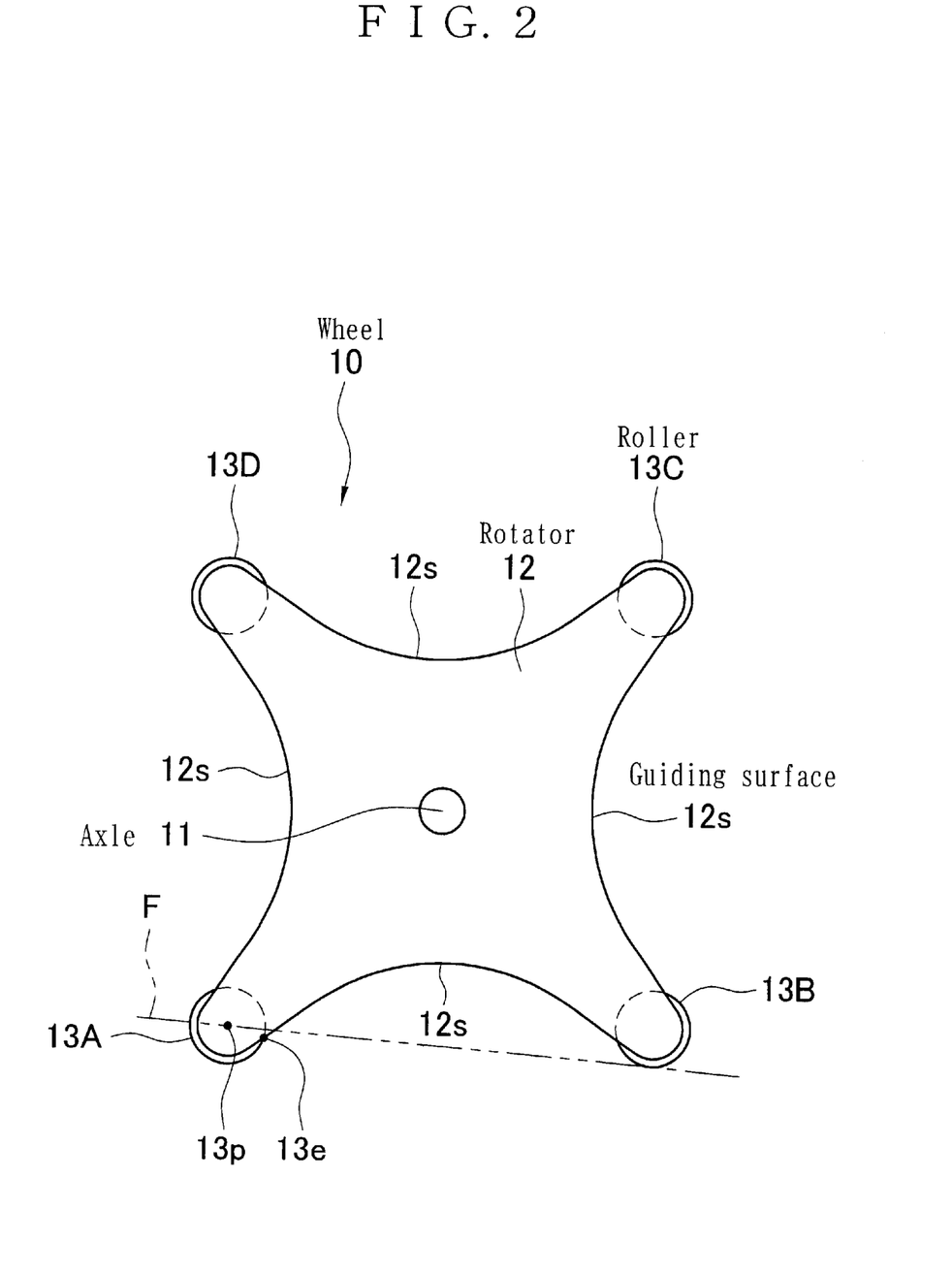
FIG. 2 is a side view of the wheel 10 of FIG. 1.

As shown in FIGS. 1 and 2, the wheel 10 comprises an axle 11, a rotator 12, and rollers 13A, 13B, 13C, and 13D.

The axle 11 will be described first.

The axle 11 is a rod-like axle member and is secured to an appropriate part, for example a bottom part, of the movable body 1. A pair of rotators 12 is journaled on the axle 11 at both its ends so as to be freely rotatable.

Alternatively, the axle 11 may be journaled freely rotatably in the movable body 1 and the pair of rotators 12 may be fixed to the axle 11.

Further alternatively, a pair of right and left axles may be secured to the right and left sides of the bottom part of the movable body 1.

Now the rotator 12 will be described.

The rotator 12 is a plate-like member made of, for example, plastic or nylon.

Any other materials can be used for the rotator 12 as far as they slide smoothly on the top corners "C" of steps and make small noise when they come in contact with them.

The rotator 12 has four apexes as seen in the direction of the axle 11. The four apexes are disposed 90° apart from one another and at the same distance from the axle 11.

The rotator 12 may have three or more apexes, including four, which are disposed rotationally symmetrically, that is, at equal angular intervals around the rotator 12 and at the same distance from the axle 11.

Figure 3:
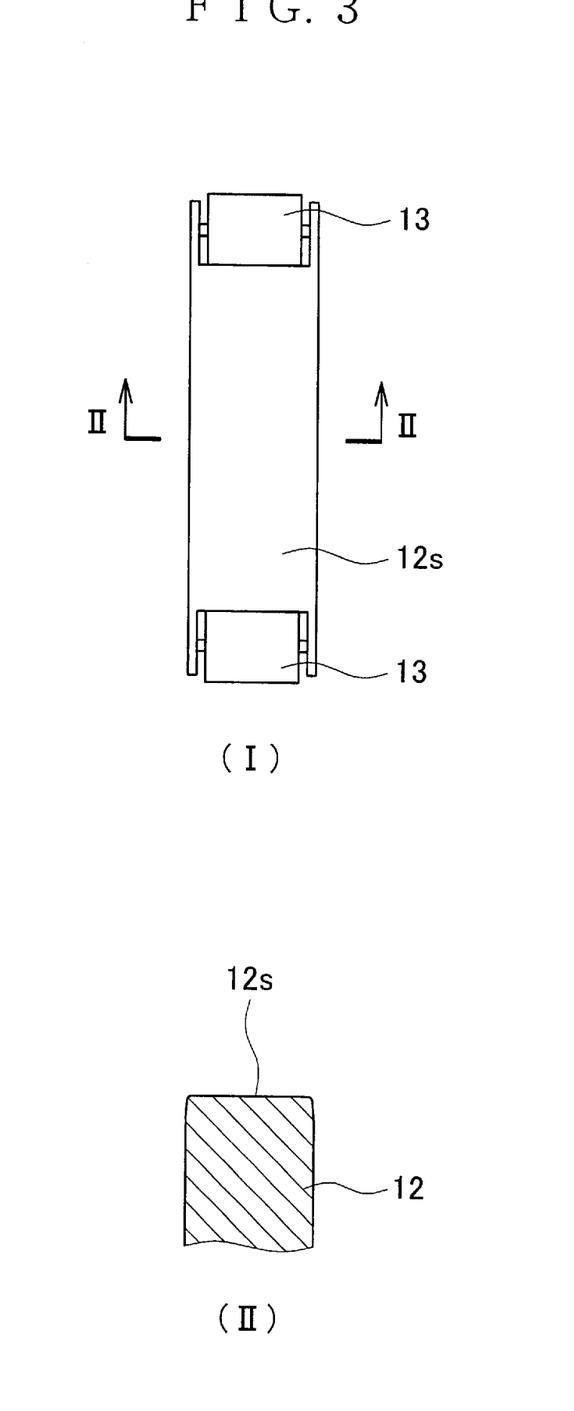

As shown in FIGS. 2 and 3, each of the four sides between apexes is concaved in an arc-like shape to constitute a "guiding surface" 12s which is mentioned in the claims of the present invention. Each guiding surface 12s is even and smooth. In addition to the smooth shape of the guiding surfaces 12s, the rotator 12 itself is made of one of the above materials. Therefore, the frictional resistance between a guiding surface 12s and the top corner "C" of a step is small while the former is sliding on the latter, as described later in detail.

The shape of the guiding surface 12s may be in other shapes.

Figure 8:
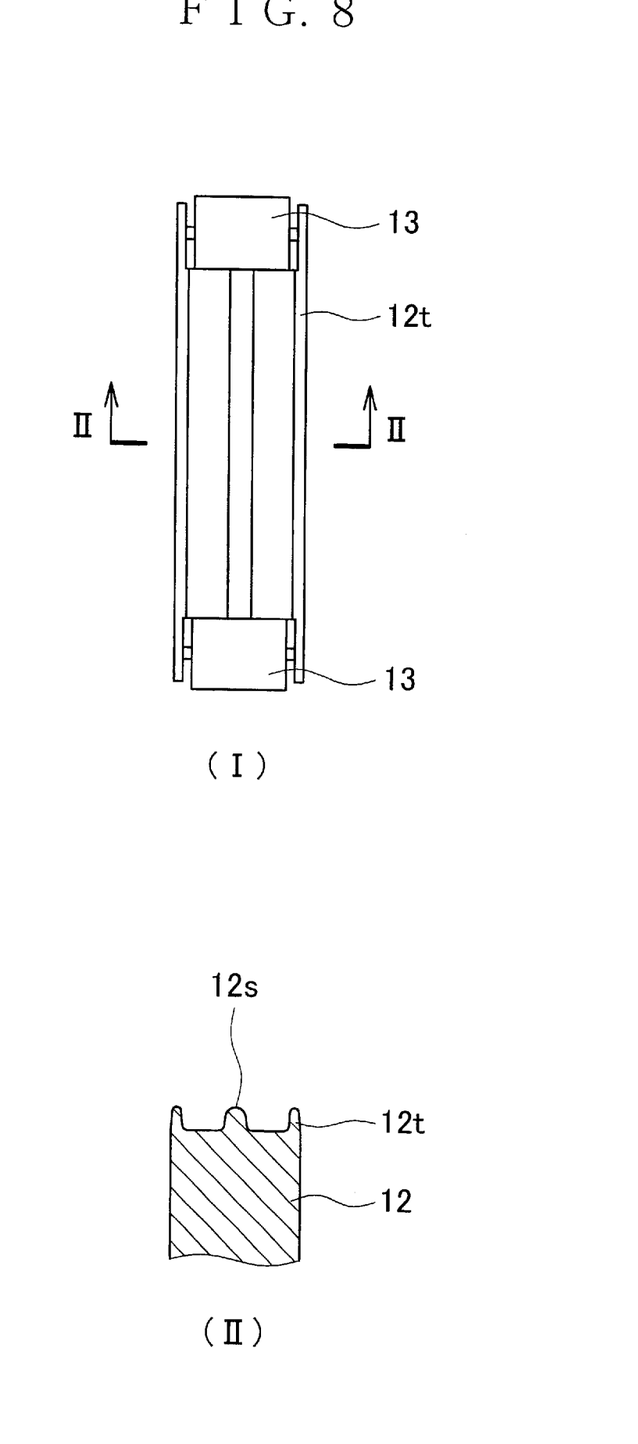
FIG. 8 shows the guiding surface 12s, in another shape, of the wheel 10 of FIG. 1.

FIG. 8 shows the guiding surface 12s in another shape. A plurality of protrusions 12t is formed on the guiding surface 12s, the former extending though the length of the latter.

Figure 9:
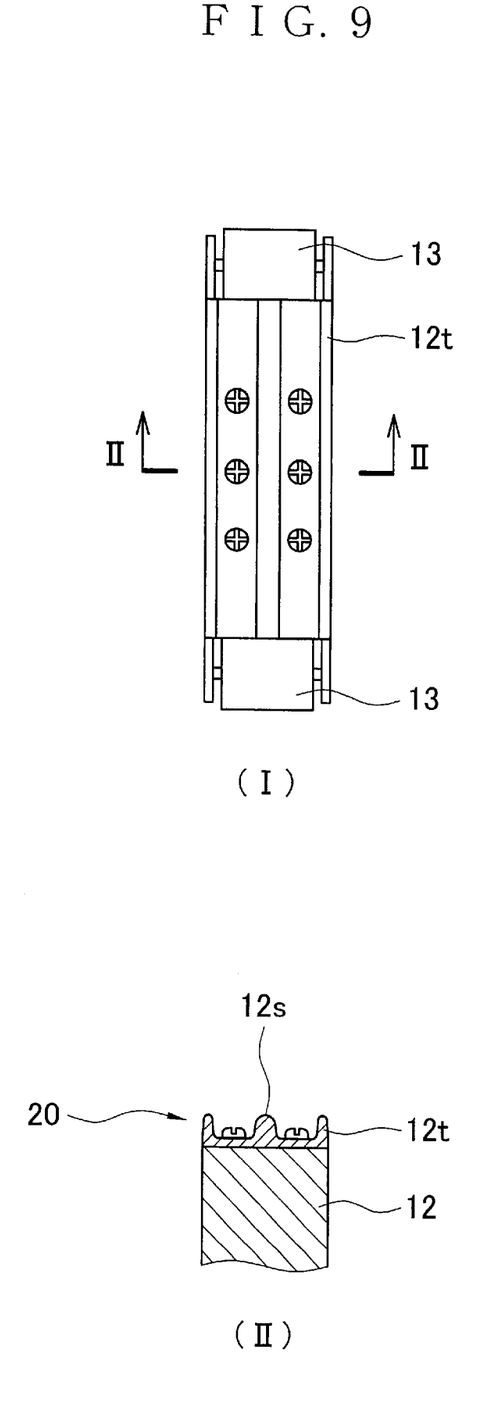
FIG. 9 shows the guiding surface 12s, in still another shape, of the wheel 10 of FIG. 1.

FIG. 9 shows the guiding surface 12s in still another shape. Each of the four sides between apexes of the rotator 12 is fitted with a slider 20, which has a plurality of protrusions 12t extending through its length and is secured to said side by screws, thus the slider 20 constituting the guiding surface 12s.

Any materials can be used for the slider 20 as far as they slide smoothly on the top corners "C" of steps and make small noise when they come in contact with them.

Besides, sliders 20 can be changed when they have worn out. Accordingly, wheels equipped with sliders 20 have a long service life.

Referring to FIG. 2, the rollers 13 will be described below.

As shown in FIG. 2, each apex of the rotator 12 is provided with a roller 13, which is freely rotatable. Each roller is a cylindrical member made of, for example, plastic or nylon. When the wheel 10 travels on the surface of a road, the rollers 13 are used.

As seen in the direction of the axle 11, the point of intersection 13e of a guiding surface 12s and the periphery of one of the two rollers 13 defining the guiding surface 12s is located outside the straight line F which extends from the center 13p of the roller 13 to be tangent to the outer portion of the other roller 13.

Besides, as seen in the direction of the axle 11, each guiding surface 12s is formed so as to cross, at a small angle, the periphery of each of the two rollers 13 defining said guiding surface 12s. In other words, each end portion of each guiding surface 12s is near parallel to the straight line which is tangent, at the point of intersection 13e, to the periphery of the roller 13 corresponding to said end portion of said guiding surface 12s.

Thus, each guiding surface 12s connects smoothly with the peripheries of the two rollers 13 defining it as seen in the direction of the axle 11.

As the wheel 10 is given the above configuration, its four rollers 13 revolve around the axle 11 while its rotator 12 is rotating on the axle 11.

Now the workings and the effect of the wheel 10 will be described.

As shown in FIG. 1, the movable body 1 fitted with a pair of wheels 10 at its bottom moves (in the direction of "a") when its handle is pulled horizontally (in the direction of "K"). As the lower rollers 13A and 13B of each wheel 10 roll on the road surface "R", the resistance while the wheels 10 are moving on the road surface "R" is reduced. Thus, by applying small pull force to the movable body 1, the wheels 10 can be moved smoothly on the road surface "IR". Meanwhile, the other two rollers 13D and 13C of each wheel 10 are positioned above the rollers 13A and 13B, respectively.

Figure 4:
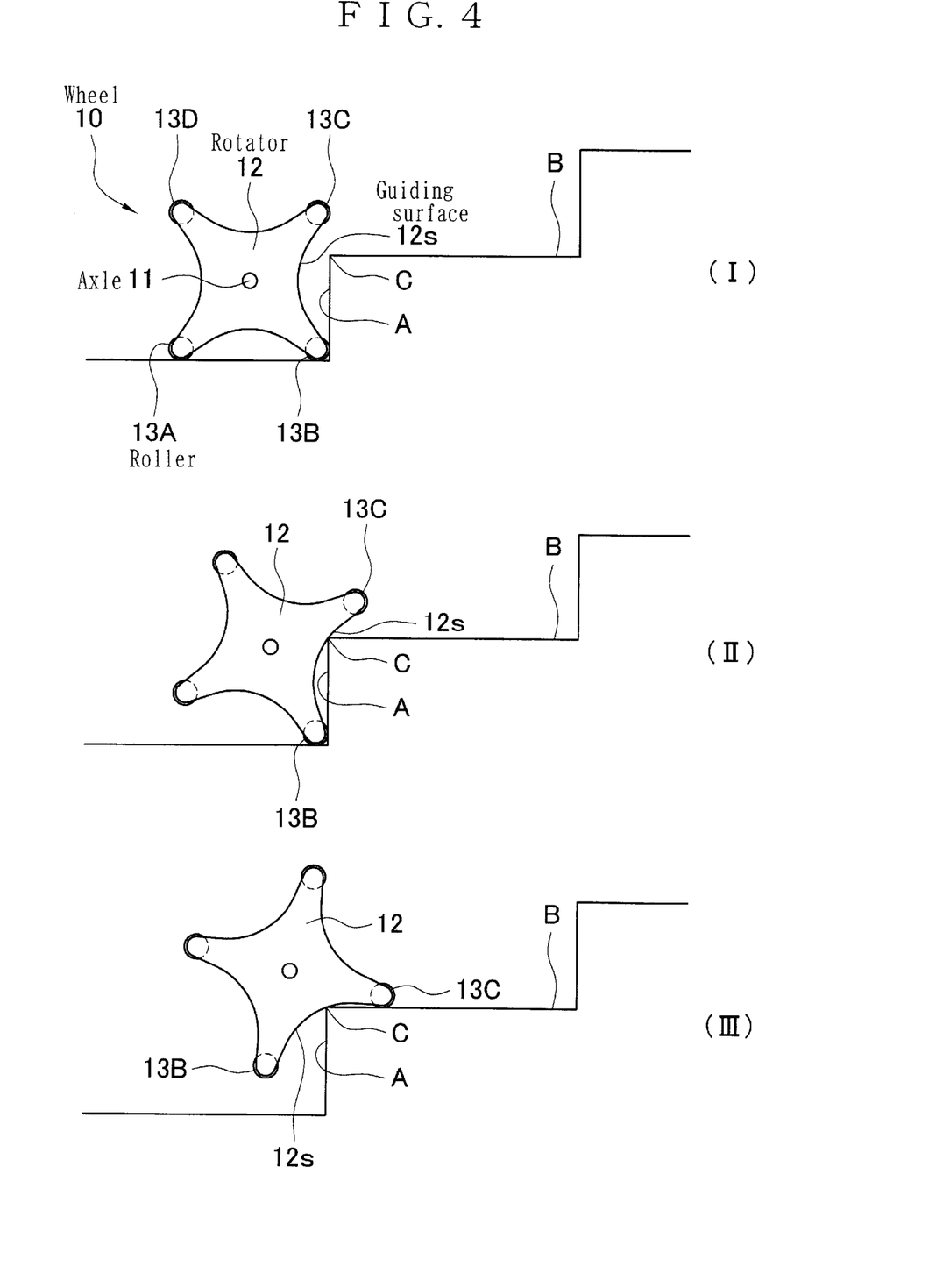
FIGS. 4 and 5 are illustrations to show the movement of the wheel 10 of FIG. 1 going up a stairway.
Figure 5:
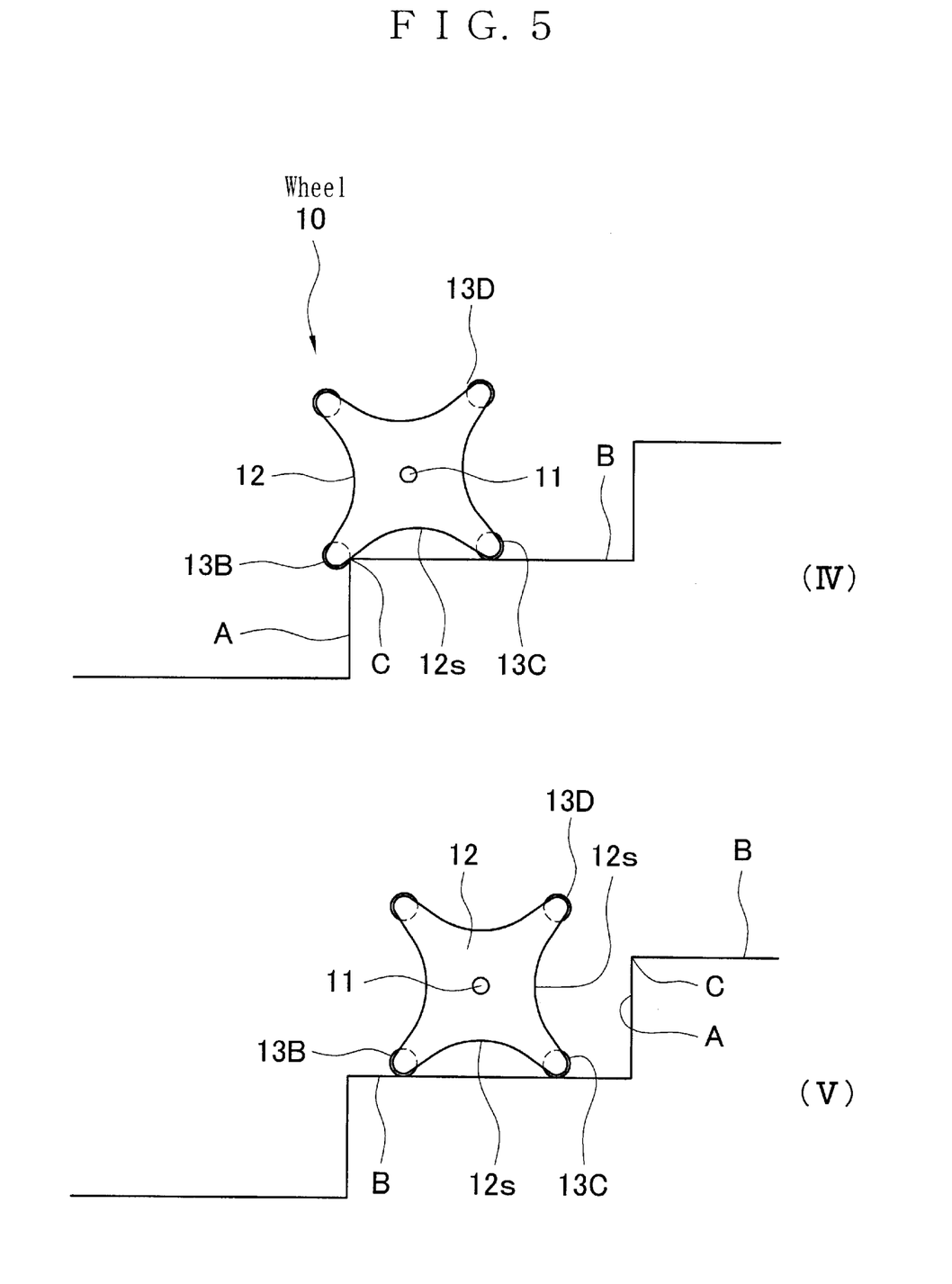

FIGS. 4 and 5 shows the movement of the wheel 10 going up a stairway. Only the wheel 10 is shown, the movable body 1 omitted.

As shown in FIG. 4(I), when the movable body 1 (not shown) reaches a stairway, the front lower roller 13B comes in contact with the riser "A" of the first step.

As shown in FIG. 4(II), when the movable body 1 (not shown) in the state of FIG. 4(I) is pulled up forward, the rotator 12 turns forward about the front lower roller 13B, for it is freely rotatable on the axle 11. While the rotator 12 is turning about the front lower roller 13B, the latter remains pressed to the riser "A". Accordingly, the guiding surface 12s on the roller 13B is brought into contact with the top corner "C" of the first step.

As shown in FIG. 4(III), when the movable body 1 is further pulled up forward, the guiding surface 12s slides on the top corner "C" of the first step. Thus, the movable body 1 (not shown) can be pulled up forward together with the wheel 10.

The rotator 12 is made of a material of small frictional resistance. In addition, because the guiding surface 12s is concaved in an arc-like shape, the angle between the tangent to the point of the guiding surface 12s where it is in contact with the top corner "C" of the first step and the tread of the first step is small. Therefore, the component of the pull force to pull the rotator 12 up forward is large. Accordingly, by applying relatively small force to the movable body 1 to slide the guiding surface 12s on the top corner "C", the movable body 1 can be pulled up.

In addition, because the guiding surface 12s of the rotator 12 is concaved in an arc-like shape, the rotator 12 turns about the top corner "C" while the guiding surface 12s is sliding on the top corner "C". Because the distance between the top corner "C" and the roller 13C is small, the turning speed of the roller 13C is small.

Moreover, because the rotator 12 moves forward, its point of contact with the top corner "C" moves backward on the guiding surface 12s and the rotator 12 turns forward continuously about the top corner "C".

Thus, the roller 13C can be moved forward to put it on the tread "B", causing only a small shock.

As shown in FIG. 5 (IV), when the movable body 1 (not shown) in the state of FIG. 4(III) is further pulled up forward, the roller 13C rolls on the tread "B" and the contact point between the guiding surface 12s and the top corner "C"

moves further backward on the guiding surface 12s until the point of intersection of the guiding surface 12s and the periphery of the roller 13B comes in contact with the top corner "C".

Figure 6:
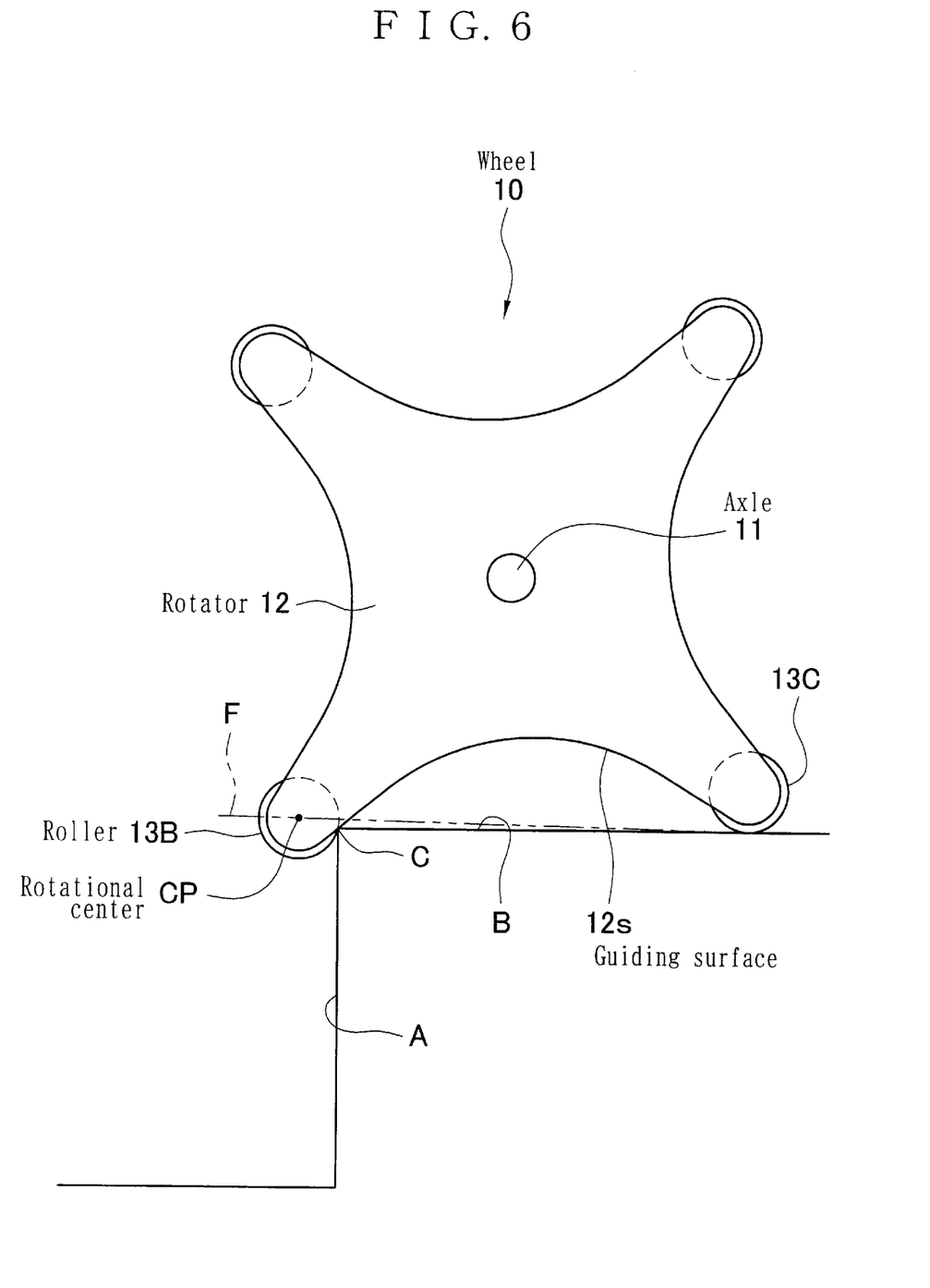
FIG. 6 is an enlarged view of the wheel 10 of FIG. 5(IV)

FIG. 6 is an enlarged view of the wheel 10 of FIG. 5(IV). As shown in FIG. 6, the point of intersection of the guiding surface 12s and the periphery of the roller 13B is lower than the straight line which extends from the center of the roller 13B to be tangent to the bottom of the roller 13C.

Therefore when the roller 13B comes in contact with the top corner "C", the center of rotation "CP" of the roller 13B is positioned above the top corner "C". Accordingly, the horizontal component of the force pulling up the movable body 1 forward acts to the roller 13B to turn it upward about the top corner "C". Thus, with relatively small force, the roller 13B can be pulled up onto the tread "B".

The roller 13B turns forward when it comes in contact with the top corner "C". On the other hand, the guiding surface 12s connects smoothly with the periphery of the roller 13B.

Therefore, the shock and vibration when the roller 13B comes in contact with the top corner "C" are reduced, and the roller 13B moves smoothly from the riser "A" to the tread "B".

If the guiding surface 12s connects smoothly with the periphery of the roller 13B but their point of intersection is above the strait line which extends from the rotational center "CP" of the roller 13B to be tangent to the bottom of the roller 13C, the rotational center "CP" of the roller 13B is positioned below the tread "B" when the roller 13B comes in contact with the top corner "C". Thus, the roller 13B runs into the riser "A" horizontally, causing a large shock. Besides, the horizontal component of the force pulling up the movable body 1 forward cannot be made use of to turn the roller 13B upward about the top corner "C".

While the wheel 10 is pulled up from the road surface onto the tread "B" of the first step, the rotator 12 turns by 90°, or the central angle between apexes of the rotator 12.

Because the rotator 12 is provided with a guiding surface 12s on each of the four sides, the guiding surface 12s between the rollers 13C and 13D faces forward on the first step. Thus, while the wheel 10 is going up the stairway, one of the four guiding surfaces 12s faces forward on every step. Accordingly, by putting the forward-facing guiding surface 12s into contact with the top corner "C" of the next step and pulling up the movable body 1 forward on every step, the wheel 10 repeats the above movement. Thus, the movable body 1 can be pulled up the stairway step by step successively.

As described above, by applying small pull force to the movable body 1 and sliding guiding surfaces 12s of the rotators 12 of the wheels 10 on the top corner "C" of each step, the movable body 1 can be pulled up onto said step together with the wheels 10. Besides, the movable body 1 can be pulled up a stairway step by step smoothly and successively, causing only small shocks and vibration.

Moreover, the shock and vibration to be caused by the rollers of the wheels 10 coming in contact with the top corner "C" of each step can be reduced, and the rollers can be moved smoothly from the riser "A" to the tread "B" of each step.

Furthermore, the movable body 1 can be pulled up a stairway step by step successively.

Now the movement of the wheel 10 going up a stairway without risers will be described.

Figure 7:
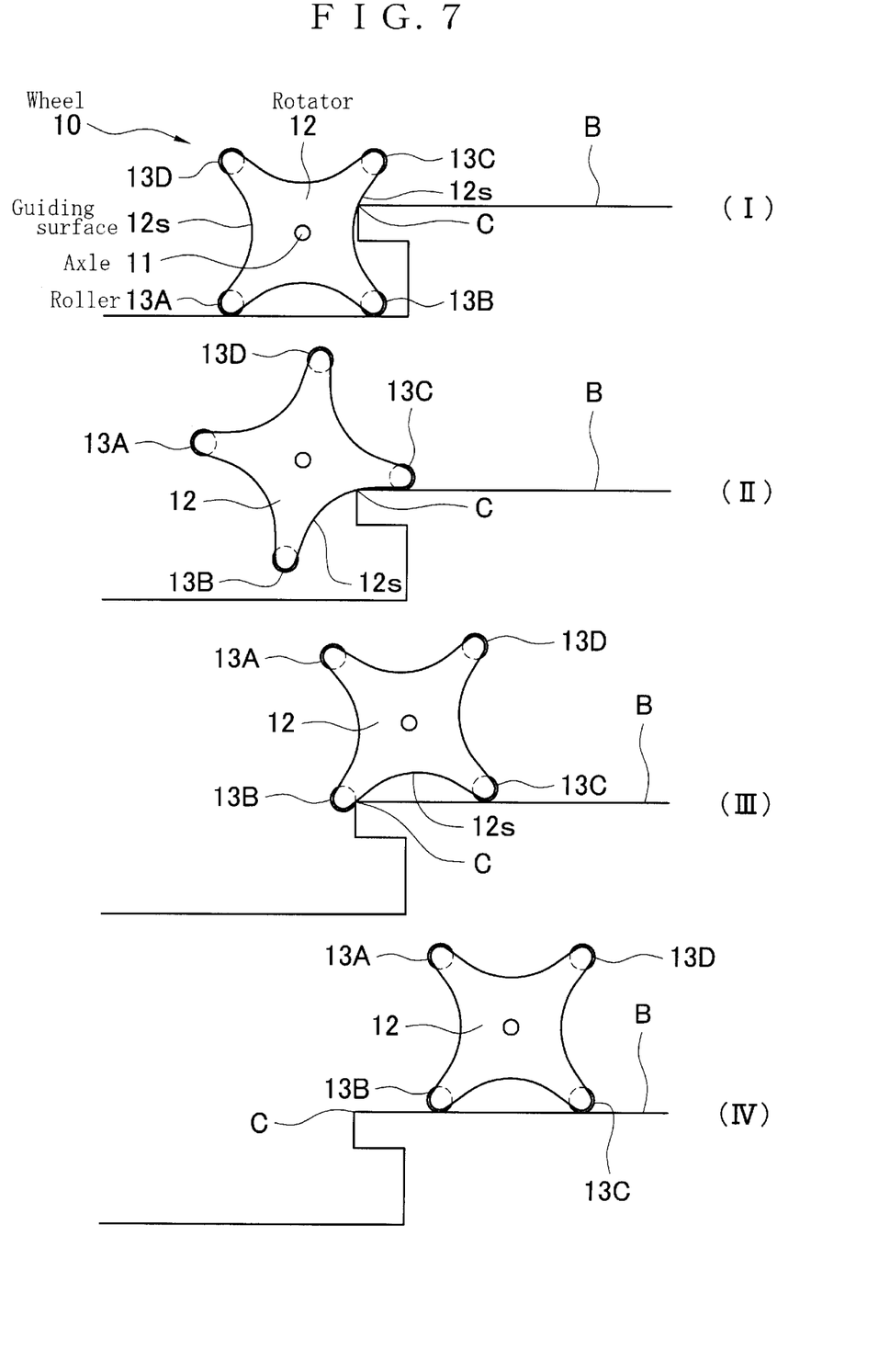
FIG. 7 is illustrations to show the movement of the wheel 10 of FIG. 1 going up a stairway without risers.

FIG. 7 is an illustration to show how the wheel 10 goes up a stairway without risers. As shown in FIG. 7, in front of a step without a riser "A", the wheel 10 cannot be turned forward about the front lower roller 13B.

However, if the step is lower than the front upper roller 13C, the guiding surface 12s between the rollers 13B and 13C can be put into contact with the top corner "C" of the step.

In this case, by putting the guiding surface 12s between the rollers 13B and 13C into contact with the top corner "C" of the step and pulling up the movable body 1 (not shown) forward, the wheel 10 can be slid upward on the top corner "C". Thereafter, by sliding the guiding surface 12s on the top corner "C" and turning the rotator 12 about the top corner "C", the wheel 10 can be pulled up onto the tread "B" of the step, as in the case of a step with a riser.

As described above, the movable body 1 can be pulled up a stairway without risers "A" together with the wheels 10 by sliding guiding surfaces 12s of the wheels 10 on the top corner "C" of each step. Besides, the force necessary for pulling up the movable body 1 can be reduced, and the shock or vibration at each step can be reduced.

The invention may be embodied in other specific forms without departing from the spirit or essential characteristics thereof. The above embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A wheel and axle combination comprising:

an axle secured to a movable body;

a rotator journaled on the axle so as to be freely rotatable and having at least three apexes disposed rotationally symmetrically around the axle and a side between each pair of apexes; and rollers, each roller being mounted on one of the apexes of the rotator so as to be freely rotatable, each said side of said rotator between apexes of the rotator being provided with a guiding surface which has small frictional resistance and is slidable, the point of intersection of each guiding surface and the periphery of one of the two rollers defining said guiding surface is positioned outside of the straight line which extends from the center of the roller to be tangent to the periphery of the other roller from the outside of the wheel.

2. The wheel and axle combination as claimed in claim 1 wherein each guiding surface is concaved in an arc-like shape.

3. The wheel and axle combination as claimed in claim 1 or 2, wherein the angle between each end portion of each guiding surface and the straight line which is, at the point of intersection of said end portion of said guiding surface and the periphery of the roller corresponding to said end portion, tangent to the periphery of the roller is small.

4. The wheel and axle combination as claimed in claim 1, wherein each guiding surface is laterally flat.

5. The wheel and axle combination as claimed in claim 1, wherein each guiding surface has plural longitudinally extending protrusions.

6. The wheel and axle combination as claimed in claim 5, wherein the protrusions are integrally formed in the material of said side.

7. The wheel and axle combination as claimed in claim 5, further comprising a slider secured to said side and forming said guiding surface, said slider being provided with said protrusions.

* * * * *